(12) United States Patent
Wang et al.

(10) Patent No.: US 11,545,301 B2
(45) Date of Patent: Jan. 3, 2023

(54) FULLY COUPLED MAGNETIC DEVICE

(71) Applicant: HANGZHOU DIANZI UNIVERSITY, Zhejiang (CN)

(72) Inventors: Ningning Wang, Zhejiang (CN); Shanfeng Peng, Zhejiang (CN); Junchao Yu, Zhejiang (CN); Feeney Ciaran, Zhejiang (CN); Tingcong Ye, Zhejiang (CN)

(73) Assignee: HANGZHOU DIANZI UNIVERSITY, Hangzhou (CN)

( * ) Notice: Subject to any disclaimer, the term of this patent is extended or adjusted under 35 U.S.C. 154(b) by 0 days.

(21) Appl. No.: 17/772,108

(22) PCT Filed: Feb. 8, 2021

(86) PCT No.: PCT/CN2021/076112
§ 371 (c)(1),
(2) Date: Apr. 26, 2022

(87) PCT Pub. No.: WO2021/185012
PCT Pub. Date: Sep. 23, 2021

(65) Prior Publication Data
US 2022/0351898 A1 Nov. 3, 2022

(30) Foreign Application Priority Data

Mar. 20, 2020 (CN) .......................... 202010201128.X

(51) Int. Cl.
*H01F 38/14* (2006.01)
*H01F 27/28* (2006.01)
*H01F 27/24* (2006.01)

(52) U.S. Cl.
CPC ............ *H01F 38/14* (2013.01); *H01F 27/24* (2013.01); *H01F 27/2847* (2013.01)

(58) Field of Classification Search
CPC ....... H01F 38/14; H01F 27/24; H01F 27/2847
See application file for complete search history.

(56) References Cited

U.S. PATENT DOCUMENTS

2015/0016150 A1* 1/2015 Schinzel .................. G05F 3/08
363/15

FOREIGN PATENT DOCUMENTS

| CN | 108492958 | A |   | 9/2018  |           |
|----|-----------|---|---|---------|-----------|
| CN | 109494977 | A |   | 3/2019  |           |
| CN | 109546856 | A |   | 3/2019  |           |
| CN | 108492958 | B | * | 9/2019  | H01F 17/062 |
| CN | 110364342 | A |   | 10/2019 |           |
| CN | 111341544 | A |   | 6/2020  |           |
| WO | 2019159455 | A1 |   | 8/2019  |           |

OTHER PUBLICATIONS

Guo, Rui et al. "Researches and applications of a new variable coupling-degree array integrated magnetics", Proceedings of the CSEE, vol. 36, No. 18, Sep. 20, 2016 (Sep. 20, 2016), parts 1.1-1.3, 2.1.

* cited by examiner

*Primary Examiner* — Jared Fureman
*Assistant Examiner* — Michael J Warmflash

(57) ABSTRACT

A fully coupled magnetic device includes at least two phases of circuits, with each phase formed by several coupling units connected in series. Every two phases of circuits are directly coupled through at least one coupling unit, and a direction of a magnetic field generated by DC (direct current) of one phase of the two phases of circuits is opposite to that of another phase of the two phases of circuits.

9 Claims, 8 Drawing Sheets

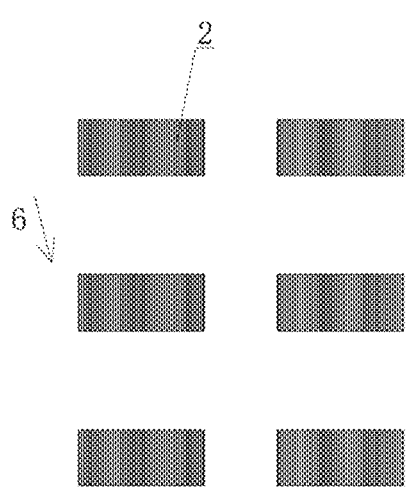
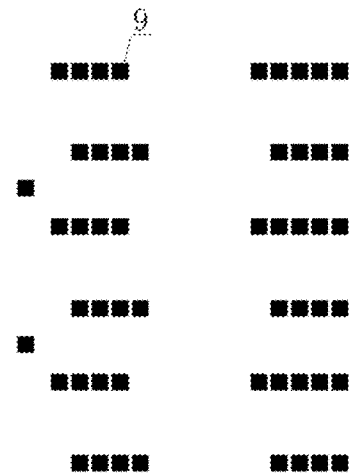
Fig. 7
Fig. 8
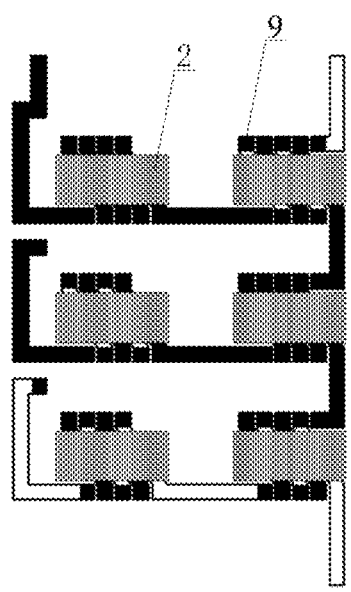
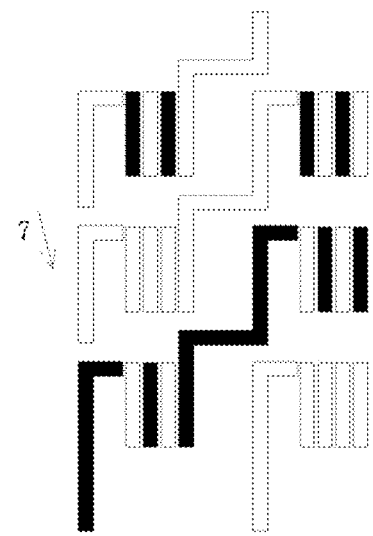
Fig. 9
Fig. 10

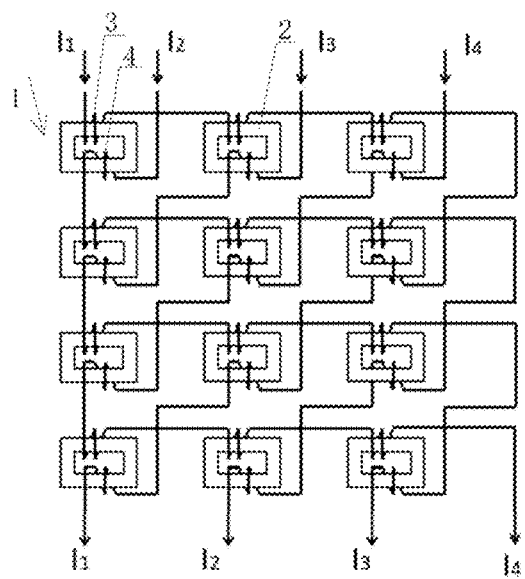
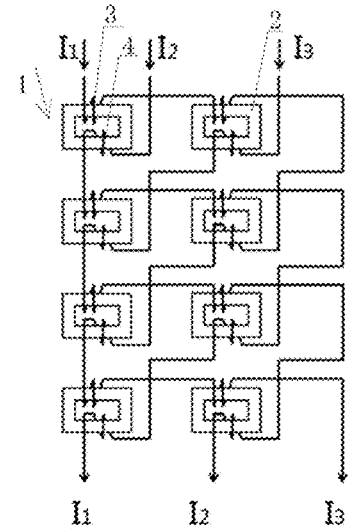
Fig. 11a
Fig. 11b
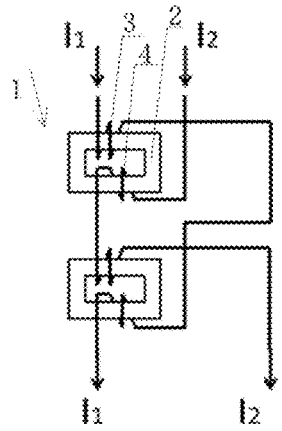
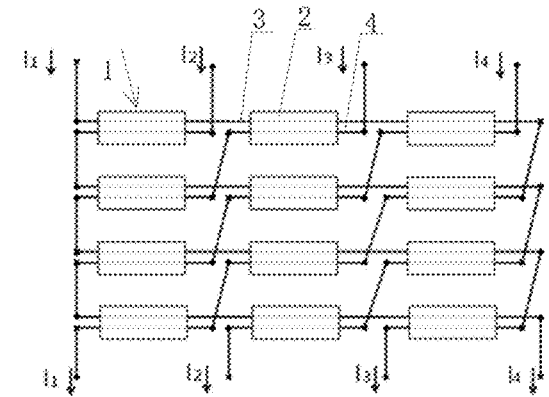
Fig. 11c
Fig. 12a
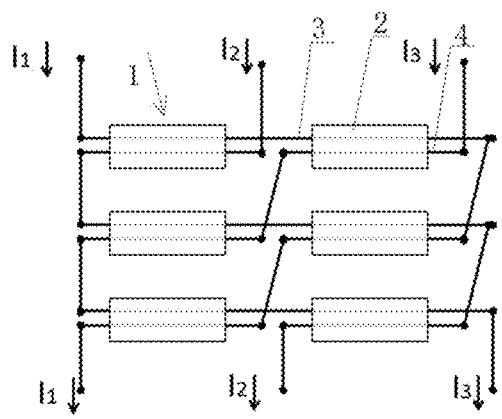
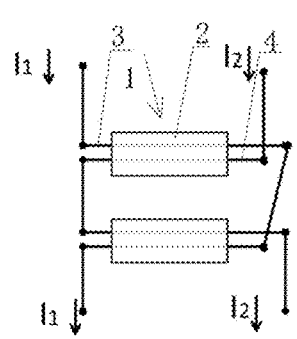
Fig. 12b
Fig. 12c

FULLY COUPLED MAGNETIC DEVICE

CROSS REFERENCE OF RELATED APPLICATION

This is a U.S. National Stage under 35 U.S.C 371 of the International Application PCT/CN2021/076112, filed Feb. 8, 2021, which claims priority under 35 U.S.C. 119(a-d) to CN 202010201128.X, filed Mar. 20, 2020.

BACKGROUND OF THE PRESENT INVENTION

Field of Invention

The present invention relates to the technical field of coupled inductors, and in particular to a fully coupled magnetic device.

Description of Related Arts

As the functions of electronic products continue to increase, the number of switching power supplies in electronic products continues to increase. At the same time, the volume of electronic products is constantly shrinking, which makes the volume of switching power supplies need to be continuously reduced. In addition, it is necessary to meet high efficiency requirement to ensure good battery usage time. Traditional switching power supplies use pre-fabricated discrete magnetic components. The discrete magnetic components are large in size and low in integration level. Therefore, it is difficult to miniaturize switching power supplies, so that the volume of electronic products is unable to be greatly reduced. It not only hinders the miniaturization of power supplies, but also is not conducive to improving the performance of future electronic products:

(1) Because of the large size, the power supply is unable to be placed very close to the load, there will be a certain distance between the power supply and the load which requires wire connections. These connections will introduce parasitic resistance and parasitic inductance, which will not only damage the transient performance of the power supply, but also brings additional conduction loss and reduces the performance of the entire power system. In the future, the load characteristics of data processing chips such as CPUs (central processing units) and GPUs (graphics processing units) of deep nanotechnology are high current and low voltage. The traditional switching power supplies based on discrete components will not be able to meet the requirements of high-performance CPUs, GPUs and other microprocessors, such as quick response and precise voltage regulation.

(2) The input voltages of CPUs and GPUs need further refined management to facilitate multiple voltage rails for different functional areas. The trend of multi-core also has led to a substantial increase in the number of power supplies in order to achieve dynamic voltage scaling and independent voltage regulation for each voltage rail. The ultimate goal is to greatly improve the power efficiency of the overall power supply and to extend battery life. This requires the switching power supply to be granular and distributed. Each power supply unit needs to be miniaturized and integrated, placed right next to the loads such as CPU and GPU, or even directly made on the same chips as CPUs and GPUs through a compatible manufacturing process, to greatly reduce the parasitic inductance and resistance of the power delivery network, and to ensure rapid transient response and precise voltage regulation, thereby significantly reducing the overall power consumption.

Considering these challenges, traditional discrete magnetic components are large in size and are unable to meet the miniaturization requirements of switching power supplies. At the same time, the switching power supply in the future will be composed of a large number of distributed switching power supply units. Each unit needs at least one magnetic device. A discrete magnetic device is unable to meet the needs in terms of low cost, ease of use and high integration level. The process of manufacturing discrete magnetic devices is also not compatible with semiconductor processes. The integrated magnetic components made using micro-nano processing technology are able to achieve miniaturization, integration. They are able to be utilized to realize complex circuit topology with increased the number of magnetic components without increasing the cost.

To illustrate the current popular topologies, the magnetic component technology background, and the existing problems, the traditional multi-phase step-down switching power supply application is used here as an example.

At present, many multi-phase step-down switching power supplies use coupled inductors, which is able to reduce current ripple and speed up the transient response of the circuit. The coupling inductor adopts a reverse coupling method. The two DC currents passing through the two-phase coupled inductor have opposite directions. Hence, the magnetic fields generated by the two DC currents cancel each other, making the coupling inductor not easy to saturate.

FIG. 1 is a schematic diagram of a four-phase step-down switching power supply circuit using traditional inductor technology. It is a typical multi-phase BUCK converter, which contains passive components such as coupled inductors and capacitors, as well as switches, driving unit and control unit.

Among them, the first phase circuit is coupled to the second phase circuit and the fourth phase circuit through the coupling units L1-2 and L1-4, and the second phase circuit is coupled to the first phase circuit and the third phase circuit through the coupling units L1-2 and L2-3, respectively. The third phase circuit is coupled to the second phase circuit and the fourth phase circuit through the coupling units L2-3 and L3-4, and the fourth phase circuit is coupled to the first phase circuit and the third phase circuit through the coupling units L1-4 and L3-4, respectively. With different number of phases, the coupling method is able to be deduced by analogy. The circuit adopts the same number of coupling units as the number of phases, and each phase is directly coupled to each of its two adjacent phases through a coupled inductor unit. If the number of phases is N, the number of coupling units is also N. The four coupling units form a coupled inductor, which is referred to herein as a multi-phase neighboring coupled inductor.

The problems of the above-mentioned multi-phase neighboring coupled inductors are: the input and output terminals are irregular, the expansion of phases is relatively poor, and the ripple of each phase is not optimal.

If each phase is able to be directly coupled with all other phases in the circuit to form a fully coupled magnetic inductance, then under the condition that the total inductance of each phase and the coupling coefficient of each coupling unit remain unchanged, regardless of the number of phases, the circuit will have a lower phase current ripple.

The inductor technology is improved further. The fully coupled magnetic device is able to be miniaturized, modular, and highly integrated. Its input and output terminals, and the arrangement of current loop of each phase have better regularity and scalability, which will not only overcome the shortcomings of multi-phase neighboring coupled inductors, but also have the advantages of small size, low cost, excellent scalability, high integration, and suitable for portable devices.

SUMMARY OF THE PRESENT INVENTION

Aiming at the defects of the prior art, the present invention provides a fully coupled magnetic device that is able to ensure direct coupling between all phases of circuits, low phase current ripple, excellent scalability, and high integration level.

In order to achieve the above-mentioned purpose of the present invention, the present invention adopts the following technical solutions:

A fully coupled magnetic device comprises at least two phases of circuits, wherein each phase circuit comprises multiple coupling units all of which are connected, every two phases of circuits are directly coupled through at least one coupling unit, and a direction of a magnetic field generated by DC (direct current) of one phase of the two phases of circuits is opposite to that of another phase of the two phases of circuits.

All phases of circuits are able to be directly coupled with each other, which is called multi-phase fully coupled inductor. Through this coupling method, under the condition that the total inductance of each phase of circuit and the coupling coefficient of each coupling unit remain unchanged, no matter when power supply phases are fully opened or partially opened, multi-phase fully coupled inductors provided by the present invention are able to lead to lower phase current ripple compared to the traditional multi-phase neighboring coupled inductors.

Preferably, an integrated fully coupled magnetic device comprises multiple identical coupling units arranged in a matrix of N rows×(N−1) columns, wherein the matrix of the coupling units is denoted as: $A=(a_{ij})_{N\times(N-1)}$, where a phase number N of the fully coupled magnetic device is an integer number≥2, $a_{ij}$ is the coupling unit in the $i^{th}$ row and $j^{th}$ column of the matrix A, i=1, 2, 3, ... N, j=1, 2, 3, ... N−1, each coupling unit comprises a magnetic core, a forward winding coil and a reverse winding coil, and the forward and reverse winding coils are wound on the magnetic core or the magnetic core wraps the forward and reverse winding coils, the number of turns of the forward and reverse winding coils is the same, and the magnetic fields in the magnetic core generated by currents in the forward and reverse winding coils are opposite to each other in direction, and all N input terminals are located at one side of the matrix, and all N output terminals are located at the other side of the matrix; when p=1 (p represents phase number and varies from 1 to N), the $1^{st}$ phase current starts from the first input terminal, passes sequentially through the forward winding coil within the coupling units of an, $a_{12}, a_{13}, \ldots a_{1(N-1)}$, and then passes sequentially through the reverse winding coil within the coupling units of $a_{2(N-1)}, a_{3(N-2)}, a_{4(N-3)}, \ldots a_{N1}$, all connected in series until reaching the first output terminal to become the complete $1^{st}$ phase circuit; when p=2, 3, 4, ... N−1, the $p^{th}$ phase current starts from the $p^{th}$ input terminal, passes through the reverse winding coil of the coupling units $a_{1(p-1)}, a_{2(p-2)}, a_{3(p-3)}, \ldots a_{(p-1)1}$, then passes through the forward winding coil of the coupling units $a_{p1}, a_{p2}, a_{p3}, \ldots a_{p(N-1)}$, then passes through the reverse winding coil of the coupling units $a_{(p+1)(N-1)}, a_{(p+2)(N-2)}, a_{(p+3)(N-3)}, \ldots a_{Np}$, all connected in series until reaching the $p^{th}$ output terminal to become the $p^{th}$ phase circuit; when p=N, the $N^{th}$ phase current starts from the $p^{th}$ input terminal, passes through the reverse winding coil of the coupling units $a_{1(p-1)}, a_{2(p-2)}, a_{3(p-3)}, \ldots a_{(p-1)1}$, and then go through the forward winding coil of the coupling units $a_{p1}, a_{p2}, a_{p3}, \ldots a_{p(N-1)}$, all connected in series until reaching the $N^{th}$ output terminal to become the $N^{th}$ phase circuit.

In the above device, the phases of circuits are directly coupled to each other, which is called multi-phase fully coupled inductor. Each phase of circuit is completely symmetrical with each other, achieving impedance balance and current balance between the phases; The process of the coupling units is exactly the same, and the coupling units are able to be made simultaneously during the production process; the layout of the coupling units in the device has very high regularity and good scalability. When the number of phases of the fully coupled integrated inductor needs to be increased, it only needs to add on a row and a column of coupling units to the matrix, which is very in line with the modular design and production of integrated circuits; the input and output terminals are located on two opposite sides of the device, which is convenient for the arrangement of input and output terminals and the routing of the power management chip.

Preferably, the forward winding coil and the reverse winding coil are both solenoid coils wound on the magnetic core, the magnetic core has a single layer structure which is made from magnetic materials or a laminated structure which is formed by stacking multiple layers of magnetic materials and insulating materials in sequence, the magnetic core has an open loop or a closed loop The solenoid type structure with the coil wound around the magnetic core is a more commonly used structure. The lamination of the magnetic core is able to keep the eddy current loss under control while increasing the total thickness the magnetic material for higher inductance value. The closed loop of the magnetic core is able to adopt a square, racetrack, or oval shapes. The racetrack or oval shaped structure is able to reduce the stress on the four corners of the magnetic core and make the magnetic flux distribution more uniform in the magnetic core.

Preferably, the coupling unit adopts sequential multi-layer deposition and integration process, from bottom to top, comprises a bottom conductor layer, a magnetic core layer and a top conductor layer. There is an insulating layer between two adjacent layers, multiple through holes are provided in the insulating layer for connecting the bottom conductor layer and the top conductor layer, the through holes are filled with conductive materials, two layers of conductors form a spiral through the through holes and are wound on the magnetic core layer, a conductive path is formed from the input terminal to the output terminal of each phase of circuit. Such an integrated device has a very thin thickness, less than 0.1 mm. The device is able to be integrated into a single chip by stacking itself on top of other semiconductor chips. It is also able to be directly built on top of power management integrated circuits (IC) fabricated in advance on a silicon wafer, thereby forming a monolithically integrated power supply, a miniaturized solution with no need of external magnetic devices. This is able to not only minimize the footprint and the thickness of the entire power supply, but also greatly shorten the interconnects between the power management IC and the magnetic device. The shortened interconnects are able to reduce the conduction loss as well as the electromagnetic interference to the outside circuit. The resulting integrated power supplies are able to be applied to replace the traditional discrete-component-based power solutions in a variety of applications, such as wearable electronics, wireless communication devices, and portable electronics.

Preferably, the bottom conductor layer, the magnetic core layer and the top conductor layer are all fabricated using conductive material by micro-nano fabrication method, and the insulating layer is fabricated using insulating material by micro-nano fabrication method, the micro-nano fabrication method comprises photolithography, electrochemical deposition, physical vapor deposition, dry etching and wet etching. The conductive material is copper and aluminum, and the insulating material is silicon dioxide or resin. The material of the magnetic core is able to be ferromagnetic materials containing iron, cobalt, nickel and other elements, has a magnetic permeability of greater than 1, which makes the coupling unit have a higher magnetizing inductance. The thickness of the magnetic core is between 0.1 μm and 100 μm, depending on the working frequency of the coupled inductor and the inductance required. In order to control the eddy current loss of the magnetic core at high frequency, the thickness of the magnetic core is generally lower than one skin depth corresponding to the frequency of the phase ripple current of the coupled inductor.

Preferably, the forward winding coil and the reverse winding coil are both stripline coils, and the magnetic core comprises an upper layer and a lower layer; the magnetic core wraps around the forward winding coil and the reverse winding coil; the magnetic core has a single layer structure which is made from magnetic materials or a laminated structure which is formed by stacking multiple layers of magnetic materials and insulating materials in sequence, the magnetic core has an open loop or a closed loop. This kind of magnetically wrapped conductor structure is also commonly used. The magnetic core is open looped with a flat plate structure for the upper and lower layers. The magnetic core is able to form a closed loop by joining the upper and lower magnetic layers, which increases the inductance density.

Preferably, the coupling unit adopts sequential multi-layer deposition and integration process, from bottom to top, comprising a bottom magnetic core, a bottom conductor layer, a top conductor layer, and a top magnetic core. There is an insulating layer between two adjacent layers. Multiple through holes are provided for connecting the top conductor layer and the bottom conductor layer; the through holes are filled with conductive materials, and a conductive path is formed from the input terminal to the output terminal of each phase of circuit.

Preferably, there are two magnetic cores, each magnetic core comprises a bottom magnetic core and a top magnetic core. The forward winding coil and the reverse winding coil are respectively spiral, and the two magnetic cores wrap around the forward winding coil and the reverse winding coil respectively. The bottom magnetic core and the top magnetic core of the each magnetic core have a single layer structure which is made from magnetic materials or a laminated structure which is formed by stacking multiple layers of magnetic materials and insulating materials in sequence, the bottom magnetic core and the top magnetic core of the each magnetic core have an open loop or a closed loop. The spiral multi-turn winding coil is able to increase the inductance density.

Preferably, the coupling unit adopts sequential multi-layer deposition and integration process, from bottom to top, comprising the bottom magnetic core, the lower wire layer, the upper wire layer and the top magnetic core. There is an insulating layer between two adjacent layers. Multiple through holes are provided for connecting the lower wire layer and the upper wire layer, and the through holes are filled with conductive materials. Both the forward winding coil and the reverse winding coil are in a spiral shape and symmetrical to each other. The forward winding coil and the reverse winding coil are in the opposite spiral direction, the forward and reverse winding coils in the bottom conductor layer are respectively positively connected to the forward and reverse winding coils in the top conductor layer through the through holes. The respective top and bottom coils form a winding coil, which is wrapped by the top and bottom magnetic cores.

Preferably, the bottom magnetic core, the bottom conductor layer, the top conductor layer and the top magnetic core are all fabricated using conductive material by micro-nano fabrication method, and the insulating layer is fabricated using insulating material by micro-nano fabrication method, the micro-nano fabrication method comprises photolithography, electrochemical deposition, physical vapor deposition, dry etching and wet etching.

The magnetic device of the present invention is a multiphase fully coupled magnetic device with all phases directly coupled to each other, it has lower phase current ripple compared to other solutions. The process of the coupling units is exactly the same, and all units are able to be made simultaneously during the production process; the layout of the coupling units in the device has very high regularity and the device has excellent scalability. The input and output terminals are located on two opposite sides of the device, which is convenient for the arrangement of input and output terminals and the routing of the power management chip. The device is able to be integrated into a single chip by stacking itself on top of other semiconductor chips. It is also able to be directly built on top of power management integrated circuits (IC) fabricated in advance on a silicon wafer, thereby forming a monolithically integrated power supply, a miniaturized solution with no need of external magnetic devices. This is able to not only minimize the footprint and the thickness of the entire power supply, but also greatly shorten the interconnects between the power management IC and the magnetic device. The shortened interconnects are able to reduce the conduction loss as well as the electromagnetic interference to the outside circuit. The resulting integrated power supplies are applied to replace the traditional discrete-component-based power solutions in a variety of applications, such as wearable electronics, wireless communication devices, and portable electronics.

BRIEF DESCRIPTION OF THE DRAWINGS

FIG. 7 shows a schematic view of the magnetic core layer in FIG. 5.

FIG. 8 shows a schematic view of the through holes in FIG. 5.

FIG. 9 shows a schematic view of the superimposed structure of the bottom conductor layer, the magnetic core layer, and the through holes in FIG. 5.

FIG. 10 is a schematic view of the top conductor layer in FIG. 5.

FIGS. 11*a*, 11*b* and 11*c* are the respective schematic diagrams of the matrix of coupling units and their connections for four-phase, three-phase, and two-phase fully coupled magnetic devices in Embodiment 3 of the present invention.

FIG. 12*a*, FIG. 12*b* and FIG. 12*c* are the respective schematic diagrams of the matrix of coupling units and their connections for four-phase, three-phase, and two-phase fully coupled magnetic devices in Embodiment 4 of the present invention.

DETAILED DESCRIPTION OF THE PREFERRED EMBODIMENT

The present invention will be further described below in conjunction with FIGS. 1-25 and the specific embodiments.

Embodiment 1

A fully coupled magnetic device comprises at least two phases of circuits, wherein each phase of circuit comprises multiple coupling units 1 all of which are connected, every two phases of circuits are directly coupled through at least one coupling unit 1, and a direction of a magnetic field generated by a DC (direct current) of one phase of the two phases of circuits is opposite to that of another phase of the two phases of circuits.

Figure 2:
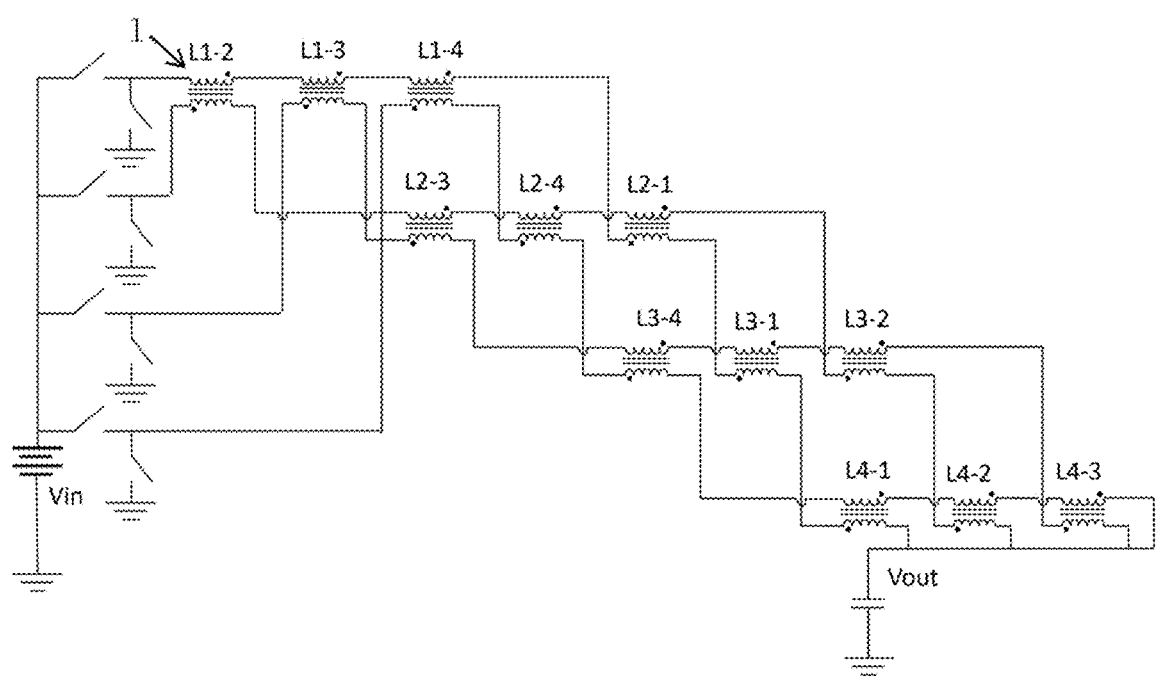
FIG. 2 shows a schematic diagram of a fully coupled four-phase step-down switching power supply circuit according to Embodiment 1 of the present invention.

As shown in FIG. 2, taking a four-phase step-down switching power supply as an example, which comprises twelve coupling units 1, namely, L1-2, L1-3, L1-4, L2-1, L2-3, L2-4, L3-1, L3-2, L3-4, L4-1, L4-2, and L4-3; the first phase current starts from the 1st input terminal and flows through L1-2, L1-3, L1-4, L2-1, L3-1, and L4-1 in turn, reaches the $1^{st}$ output terminal, forming the first phase current path; the second phase current starts from the $2^{nd}$ input terminal and flows through L1-2, L2-3, L2-4, L2-1, L3-2, and L4-2, reaches the $2^{nd}$ output terminal, forming the second phase current path; the third phase current starts from the $3^{rd}$ input terminal and flows through L1-3, L2-3, L3-4, L3-1, L3-2, and L4-3 in turn, reaches the $3^{rd}$ output terminal, forming the third phase current path; the fourth phase current starts from the $4^{th}$ input terminal and flows through L1-4, L2-4, L3-4, L4-1, L4-2, and L4-3 in turn, reaches the $4^{th}$ output terminal, forming the fourth phase current path. The first phase circuit is directly coupled to the second phase circuit through L1-2 and L2-1, to the third phase circuit through L1-3 and L3-1, and to the fourth phase circuit through L1-4 and L4-1; the second phase circuit is directly coupled to the first phase circuit through L2-1 and L1-2, and to the third phase circuit through L2-3 and L3-2, and to the fourth phase circuit through L2-4 and L4-2; the third phase circuit is directly coupled to the first phase circuit through L3-1 and L1-3, to the second phase circuit through L3-2 and L2-3, and to the fourth phase circuit through L3-4 and L4-3; the fourth phase circuit is directly coupled to the first phase circuit through L4-1 and L1-4, to the second phase circuit through L4-2 and L2-4, and to the third phase circuit through L4-3 and L3-4. There are two coupling units between every two phases to provide direct coupling.

Figure 1:
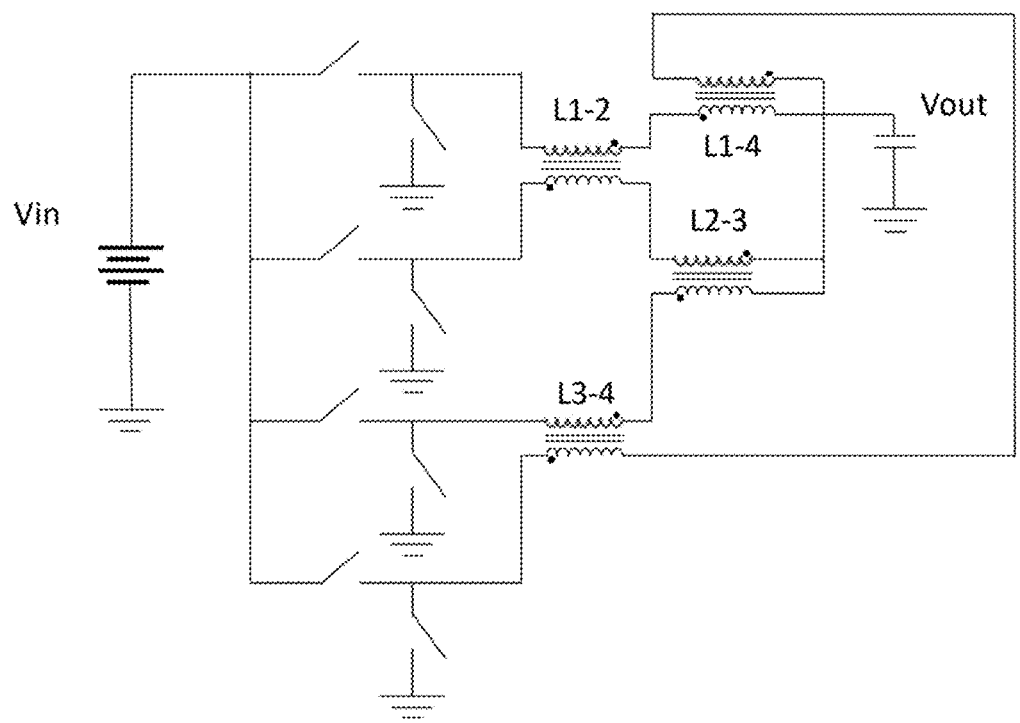
FIG. 1 shows a schematic diagram of a four-phase step-down switching power supply circuit using traditional coupled inductor technology in the prior art.

This device realizes the direct coupling between all phases. Through this coupling mode, each phase of circuit is able to be directly coupled to all other phases in the device. The four-phase step-down switching power supply circuit using traditional inductor technology shown in FIG. 1 is exactly the same as the circuit provided by the present invention shown in FIG. 2. However, due to the application of fully coupled inductance technology, with the total inductance of each phase of circuit and the coupling coefficient of each coupling unit remain unchanged, no matter when power supply phases are fully opened or partially opened, the circuit in FIG. 2 has a lower phase current ripple than that of the circuit shown in FIG. 1.

Figure 3:
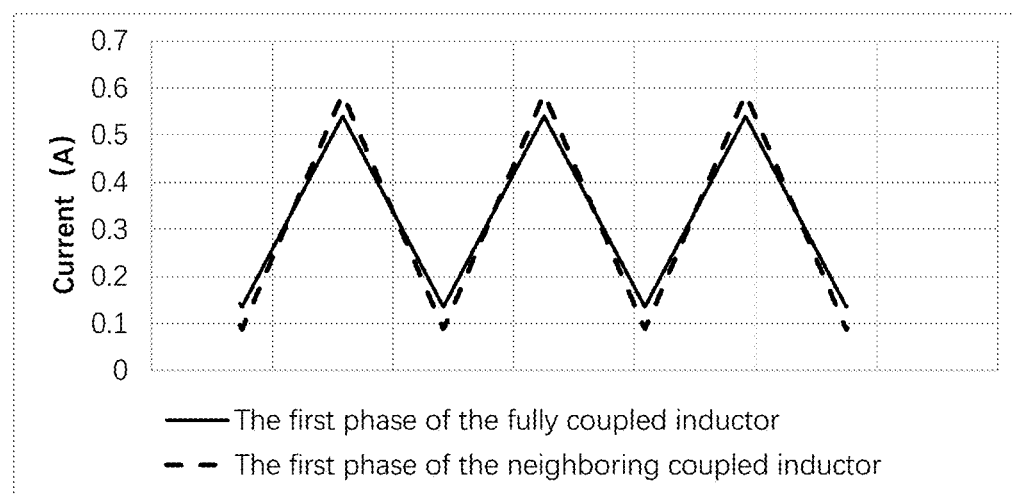
FIG. 3 shows the waveform of the first phase output current of the two circuits given in FIG. 1 and FIG. 2.

If the electrical specifications of the circuit in FIG. 1 and FIG. 2 are as follows: input voltage is 1.8V, output voltage is 0.9V, switching frequency is 30 MHz, output current is 1.35 A, total inductance per phase is 30 nH, coupling coefficient of coupling unit is −0.7, waveforms of the first phase output current of both circuits are shown in FIG. 3. The current ripple ratio of each phase of the multi-phase fully coupled magnetic device is 81.1% of that of the multi-phase neighboring coupled inductor.

This fully coupled approach uses a matrix of N×(N−1) coupling units. Compared with the N coupling units in FIG. 1, although the number is increased, it has much lower phase current ripples and output current ripples.

Embodiment 2

A fully coupled magnetic device comprises multiple identical coupling units 1 arranged in a matrix of N rows×(N−1) columns, and the matrix of coupling units is denoted as:

$A=(a_{ij})_{N\times(N-1)}$, wherein a phase number N of the fully coupled magnetic device is an integer number≥2, $a_{ij}$ is the coupling unit 1 in the $i^{th}$ row and $j^{th}$ column of the matrix A, i=1, 2, 3, . . . N, j=1, 2, 3, . . . N−1, each coupling unit 1 comprises a magnetic core 2, a forward winding coil 3 and a reverse winding coil 4, and the forward winding coil 3 and the reverse winding coil 4 are wound on the magnetic core 2 or the magnetic core 2 wraps the forward and reverse winding coils, the number of turns of the forward and reverse winding coils is the same, and the magnetic fields in the magnetic core 2 generated by currents in the forward and reverse winding coils are opposite to each other in direction, and all N input terminals are located at one side of the matrix, and all N output terminals are located at the other side of the matrix. When the number p=1 (p represents phase number and varies from 1 to N), the $1^{st}$ phase current starts from the first input terminal, passes sequentially through the forward winding coil 3 within the coupling units of $a_{11}$, $a_{12}$, $a_{13}$, . . . $a1_{(N-1)}$, and then passes sequentially through the reverse winding coil 4 within the coupling units of $a_{2(N-1)}$, $a_{3(N-2)}$, $a_{4(N-3)}$, . . . $a_{N1}$, all connected in series until reaching the first output terminal to become the complete $1^{st}$ phase; when p=2, 3, 4, . . . N−1, the $p^{th}$ phase current starts from the $p^{th}$ input terminal, passes through the reverse winding coil 4 of the coupling units $a_{1(p-1)}$, $a_{2(p-2)}$, $a_{3(p-3)}$, . . . $a_{(p-1)1}$, then passes through the forward winding coil 3 of the coupling units $a_{p1}$, $a_{p2}$, $a_{p3}$, . . . $a_{p(N-1)}$, then passes through the reverse winding coil 4 of the coupling units $a_{(p+1)(N-1)}$, $a_{(p+2)(N-2)}$, $a_{(p+3)(N-3)}$, . . . $a_{Np}$, all connected in series until reaching the $p^{th}$ output terminal to become a phase; when p=N, the $N^{th}$ current starts from the $p^{th}$ input terminal, passes through the reverse winding coil 4 of the coupling units $a_{1(p-1)}$, $a_{2(p-2)}$, $a_{3(p-3)}$, . . . $a_{(p-1)1}$, and then go through the forward winding coil 3 of the coupling units $a_{p1}$, $a_{p2}$, $a_{p3}$, . . . $a_{p(N-1)}$, all connected in series until reaching the $N^{th}$ output terminal to become a phase.

Among them, the forward winding coil 3 and the reverse winding coil 4 are both solenoid coils, and the magnetic core 2 is an open loop.

Figure 4A:
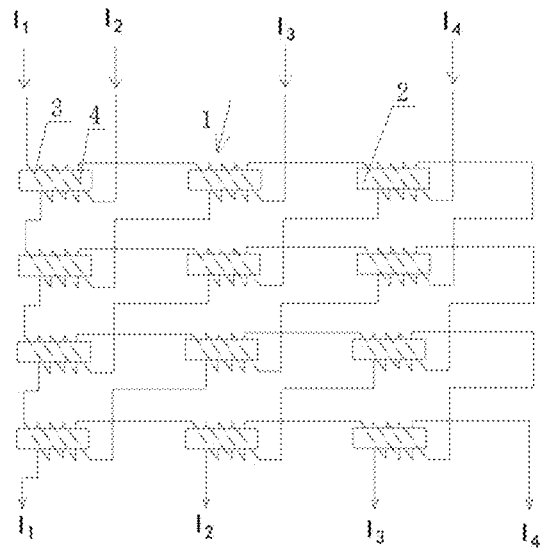
FIG. 4a, FIG. 4b and FIG. 4c are the respective schematic diagrams of the matrix of coupling units and their connections for four-phase, three-phase and two-phase fully coupled magnetic devices in Embodiment 2 of the present invention.
Figure 4B:
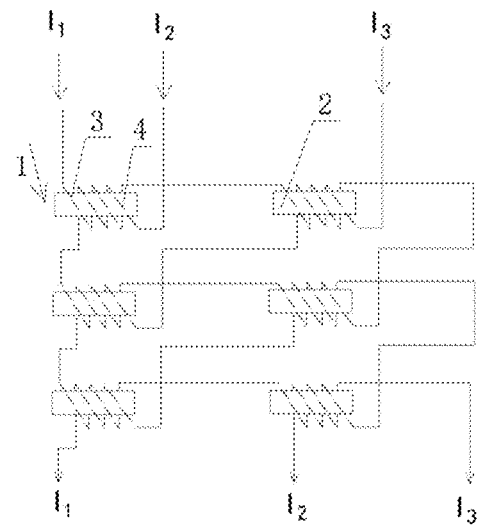
Figure 4C:
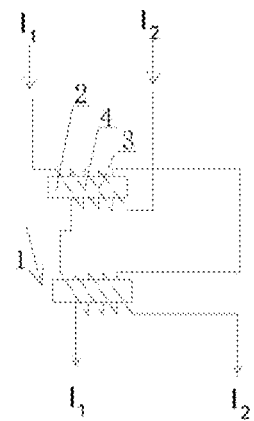

As shown in FIGS. 4a, 4b and 4c, N is 4, 3, and 2 respectively.

As shown in FIG. 4a, N=4, there are 4×3=12 coupling units, when p=1, the first phase current starts from the $1^{st}$ input terminal, passes the forward winding coil 3 of $a_{11}$, $a_{12}$ and $a_{13}$, and then passes the reverse winding coil 4 of $a_{23}$, $a_{32}$ and $a_{41}$, all connected in series until reaching the $1^{st}$ output terminal; when p=2, $a_{2(p-2)}$ and $a_{3(p-3)}$ do not exist, so the second phase current starts from the $2^{nd}$ input terminal, passes through the reverse winding coil 4 of $a_{11}$, then passes the forward winding coil 3 of $a_{21}$, $a_{22}$ and $a_{23}$, and then passes the reverse winding coil 4 of $a_{33}$ and $a_{42}$, and reaches the $2^{nd}$ output terminal in series. Similarly, when p=3, the third phase current starts from the $3^{rd}$ input terminal, passes through the reverse winding coil 4 of $a_{12}$ and $a_{21}$, then passes through the forward winding coil 3 of $a_{31}$, $a_{32}$ and $a_{33}$, and then passes through the reverse winding coil 4 of $a_{43}$, and reaches the $3^{rd}$ output terminal in series; when p=4, the fourth phase current starts from the $4^{th}$ input terminal, passes through the reverse winding coil 4 of $a_{13}$, $a_{22}$ and $a_{31}$, and then passes the forward winding coil 3 of $a_{41}$, $a_{42}$, $a_{43}$, and reaches the $4^{th}$ output terminal in series.

The twelve coupling units are $a_{11}$, $a_{12}$, $a_{13}$, $a_{21}$, $a_{22}$, $a_{23}$, $a_{31}$, $a_{32}$, $a_{33}$, $a_{41}$, $a_{42}$, $a_{43}$, wherein $a_{11}$ and $a_{23}$ provide the coupling between the first phase circuit and the second phase circuit at the same time; $a_{12}$ and $a_{32}$ provide the coupling between the first phase circuit and the third phase circuit at the same time; $a_{13}$ and $a_{41}$ provide the coupling between the first phase circuit and the fourth phase circuit at the same time; and $a_{21}$ and $a_{33}$ provide the coupling between the second phase circuit and the third phase circuit at the same time; $a_{22}$ and $a_{42}$ provide the coupling between the second phase circuit and the fourth phase circuit at the same time; $a_{31}$ and $a_{43}$ provide the coupling between the third phase circuit and the fourth phase circuit at the same time, so as to realize the direct coupling between every two phases of circuits of the four-phase fully coupled magnetic device.

As shown in FIG. 4b, N=3, there are 3×2=6 coupling units. When p=1, the first phase current passes through the forward winding coil 3 of $a_{11}$ and $a_2$ from the $1^{st}$ input terminal, and then passes through the reverse winding coil 4 of $a_{22}$ and $a_{31}$, reaches the $1^{st}$ output terminal; when p=2, the second phase current passes through the reverse winding coil 4 of $a_{11}$ from the $2^{nd}$ input terminal, and then passes the forward winding coil 3 of $a_{21}$ and $a_{22}$, then passes through the reverse winding coil 4 of $a_{32}$, reaches the $2^{nd}$ output terminal. Similarly, when p=3, the third phase current passes through the reverse winding coil 4 of $a_{12}$ and $a_{21}$ from the $3^{rd}$ input terminal, and then through the forward winding coil 3 of $a_{31}$ and $a_{32}$, reaches the $3^{rd}$ output terminal.

The six coupling units are $a_{11}$, $a_{12}$, $a_{21}$, $a_{22}$, $a_{31}$ and $a_{32}$, wherein $a_{11}$ and $a_{22}$ provide the coupling between the first phase and the second phase at the same time, $a_{12}$ and $a_{31}$ provide the coupling between the first phase and the third phase at the same time, $a_{21}$ and $a_{32}$ provide the coupling between the second phase and the third phase at the same time, so as to realize the direct coupling between every two phases of circuits of the three-phase fully coupled magnetic device.

As shown in FIG. 4c, N=2, there are 2×1=2 coupling units, when p=1, the first phase current passes through the forward winding coil 3 of an from the first input terminal, and then passes through the reverse winding coil 4 of $a_{21}$, and is connected in series to the $1^{st}$ output terminal; when p=2, the second phase current passes through the reverse winding coil 4 of $a_{11}$ from the second input terminal, and then goes in series through the forward winding coil 3 of $a_{21}$ to the $2^{nd}$ output terminal.

The two coupling units are $a_{11}$ and $a_{21}$ wherein $a_{11}$ and $a_{21}$ provide the coupling between the first phase circuit and the second phase circuit at the same time, so as to realize the coupling between the two phases of circuits of the two-phase fully coupled magnetic device.

Figure 5:
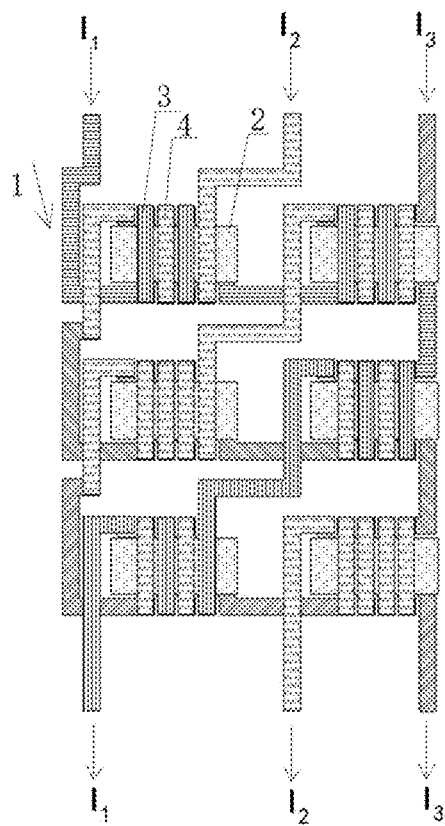
FIG. 5 shows a schematic view of the structure of the three-phase fully coupled magnetic device in FIG. 4*b* manufactured by sequential multi-layer deposition and integration process.
Figure 6:
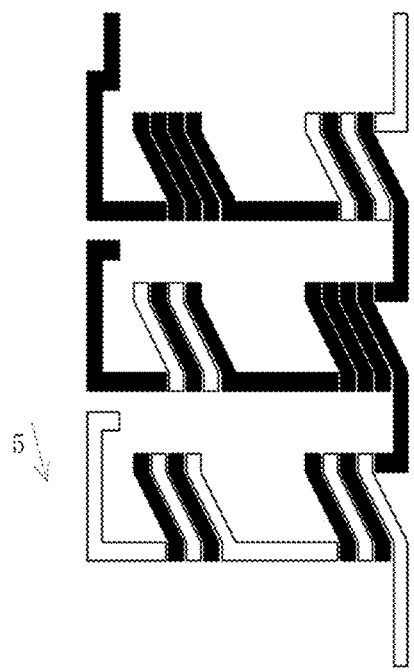
FIG. 6 shows a schematic view of the bottom conductor layer in FIG. 5.

As shown in FIGS. 5-10, the coupling unit 1 of the three-phase coupled magnetic device shown in FIG. 5 is integrated by sequential multi-layer deposition process, which comprises a bottom conductor layer 5, a magnetic core layer 6, and a top conductor layer 7 from bottom to top. There is an insulating layer 8 between two adjacent layers (not shown in the drawings). Multiple through holes 9 are provided in the insulating layer 8 for connecting the bottom conductor layer 5 and the top conductor layer 7. The through holes 9 are filled with conductive materials. Two layers of conductors are wound on the magnetic core layer 6 through the through holes 9 and form a conductive path from the input terminal to the output terminals of each phase circuit.

FIGS. 6-10 are schematic views of the bottom conductor layer 5, the magnetic core layer 6, the through hole 9 and the top conductor layer 7 shown in FIG. 5, respectively. FIG. 9 is a schematic view of a superimposed structure of the bottom conductor layer 5, the magnetic core layer 6, and the through holes 9.

The six magnetic cores 2 in FIG. 7 respectively correspond to the six coupling units 1 arranged in a 3×2 matrix for a three-phase fully coupled magnetic device.

The bottom conductor layer 5, the magnetic core layer 6 and the top conductor layer 7 are all fabricated using micro-nano fabrication processes comprising photolithography, electrochemical deposition, physical vapor deposition, dry etching and wet etching.

The magnetic core 2 may be laminated, and formed by sequentially stacking multiple layers of magnetic core materials and insulating materials.

Embodiment 3

FIGS. 11a, 11b and 11c are the respective schematic diagrams of the matrix of coupling units and their connections for four-phase, three-phase and two-phase fully coupled magnetic devices. All parts are similar to those in embodiment 2, except for the magnetic core 2 in FIGS. 11a, 11b and 11c is a closed loop, which is able to form a closed magnetic flux loop to increase the inductance density.

Embodiment 4

FIG. 12a, FIG. 12b, and FIG. 12c are the respective schematic diagrams of the matrix of coupling units and their connections for four-phase, three-phase, and two-phase fully coupled magnetic devices. The devices are similar to those in Embodiment 2. The difference between Embodiment 4 and Embodiment 2 is: both the forward winding coil 3 and the reverse winding coil 4 are stripline coils; the magnetic core 2 has top and bottom layers, the magnetic core 2 wraps around the forward winding coil 3 and the reverse winding coil 4, and the top and bottom layers of the magnetic core 2 are in planar shape which doesn't form a closed loop.

Figure 13:
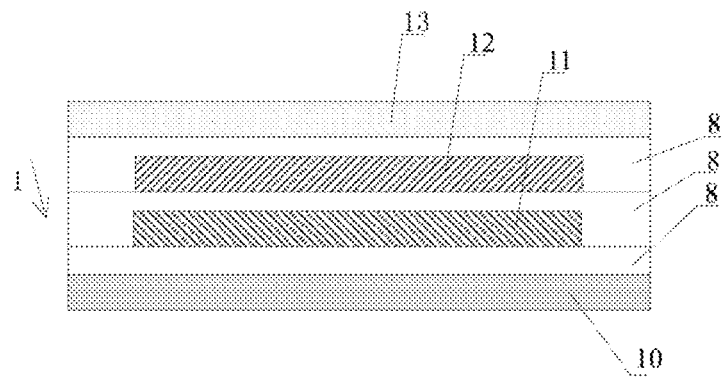
FIG. 13 shows a schematic cross section view of an integrated coupling unit shown in FIGS. 12*a*, 12*b* and 12*c*.
Figure 14:
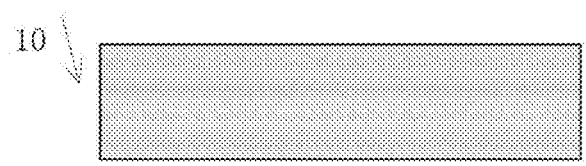
FIG. 14 shows a schematic top view of the bottom magnetic core of the coupling unit shown in FIG. 13.
Figure 15:
FIG. 15 shows a schematic top view of the bottom conductor layer of the coupling unit shown in FIG. 13.
Figure 16:
FIG. 16 shows a schematic top view of the top conductor layer of the coupling unit shown in FIG. 13.
Figure 17:
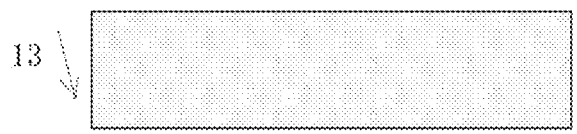
FIG. 17 shows a schematic top view of the top layer magnetic core of the coupling unit shown in FIG. 13.
Figure 18:
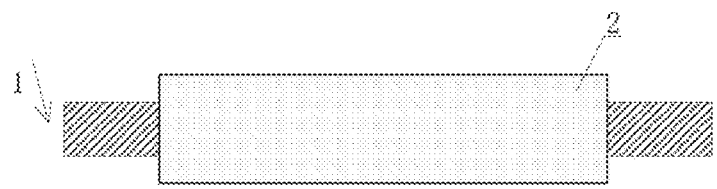
FIG. 18 shows a schematic top view of the coupling unit shown in FIG. 13.

FIG. 13 shows a schematic cross section view of an integrated coupling unit shown in FIGS. 12a, 12b, and 12c. FIG. 14 to FIG. 17 are schematic top views of the bottom magnetic core layer 10, the bottom conductor layer 11, the top conductor layer 12, and the top magnetic core layer 13 of the coupling unit shown in FIG. 13, respectively. FIG. 18 shows a schematic top view of the coupling unit shown in FIG. 13.

As shown in FIGS. 13-18, the coupling unit 1 is integrated by sequential multi-layer deposition, from bottom to top including a bottom magnetic core layer 10, a bottom conductor layer 11, a top conductor layer 12, a top magnetic core layer 13. There is an insulating layer 8 between two adjacent layers. Through holes 9 (not shown in the drawings) for connecting the bottom conductor layer 11 with the top conductor layer 12. The through holes 9 are filled with conductive materials. A conductive path is formed between the input and the output terminals through the bottom conductor layer 11, the top conductor layer 12 and the through holes 9.

Embodiment 5

Figure 19:
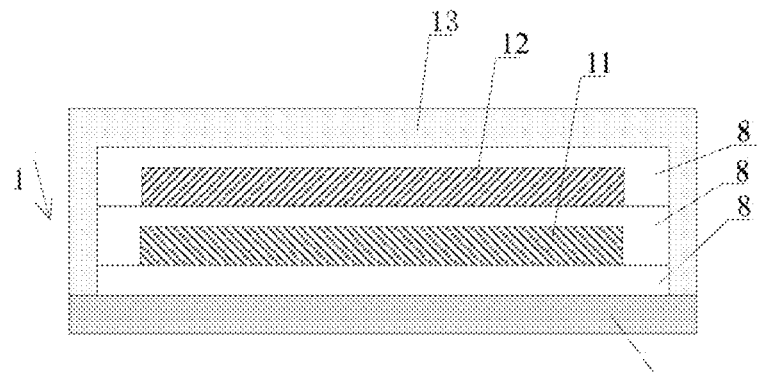
FIG. 19 shows a schematic cross section view of a coupling unit in Embodiment 5 of the present invention.

All parts in Embodiment 5 are similar to those in Embodiment 4, except for the magnetic core 2. As shown in FIG. 19, the bottom magnetic core layer 10 and the top magnetic core layer 13 are connected to form a closed loop to increase the inductance density, while the bottom magnetic core layer 10 and the top magnetic core layer 13 are not connected in Embodiment 4.

Embodiment 6

Figure 20:
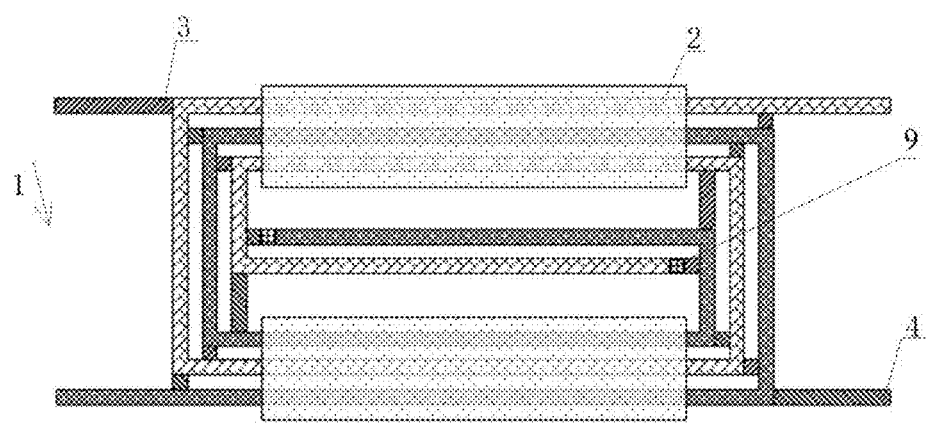
FIG. 20 shows a schematic top view of a multi-layer integrated coupling unit in Embodiment 6 of the present invention.
Figure 21:
FIG. 21 is a schematic top view of the bottom magnetic core in FIG. 20.
Figure 22:
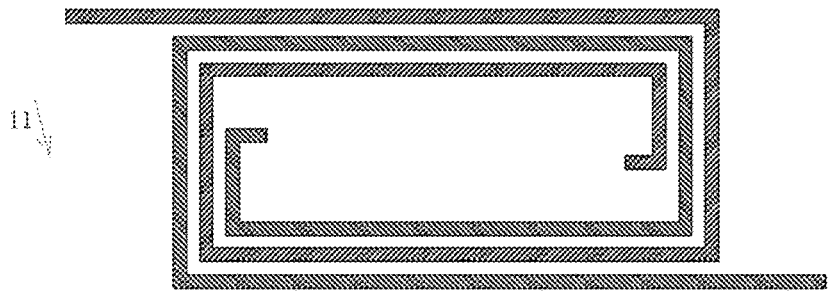
FIG. 22 is a schematic top view of the bottom conductor layer of the coupling unit in FIG. 20.
Figure 23:
FIG. 23 is a schematic top view of the through holes of the coupling unit in FIG. 20.
Figure 24:
FIG. 24 is a schematic top view of the top conductor layer of the coupling unit in FIG. 20.
Figure 25:
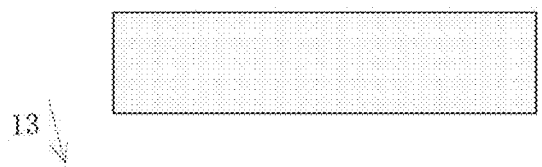
FIG. 25 is a schematic top view of the top layer magnetic core of the coupling unit in FIG. 20.

All parts and connections in Embodiment 6 are similar to those in Embodiment 2, except for the structure of the coupling unit: FIG. 20 shows a schematic top view of a multi-layer integrated coupling unit in Embodiment 6. FIG. 21 to FIG. 25 are the respective schematic top views of the bottom magnetic core layer 10, the bottom conductor layer 11, the through holes 9, the top conductor layer 12 and the top magnetic core layer 13 of the coupling unit in Embodiment 6.

As shown in FIG. 20 to FIG. 25, the coupling unit 1 comprises two magnetic cores 2. Each magnetic core 2 comprises a bottom magnetic core layer 10 and a top magnetic core layer 13. The forward winding coil 3 and the reverse winding coil 4 are in spiral shape. The two magnetic cores (2) respectively wrap the forward winding coil 3 and the reverse winding coil 4. The bottom magnetic core layer 10 and the top magnetic core layer 13 of each magnetic core 2 forms an open loop.

The coupling unit 1 is integrated by sequential multi-layer deposition process, from bottom to top comprising the bottom magnetic core layer 10, the bottom conductor layer 11, the top conductor layer 12 and the top magnetic core layer 13. There is an insulating layer 8 between two adjacent layers, and the through holes 9 are filled with conductive materials to provide connections between the bottom conductor layer 11 and the top conductor layer 12. Both the forward winding coils 3 and reverse winding coils 4 are in a spiral shape and symmetrical to each other. The forward winding coils 3 and the reverse winding coil 4 are interleaved in both conductor layers with opposite spiral direction; the forward and reverse winding coils in the bottom conductor layer are respectively connected to the forward and reverse winding coils in the top conductor layer through the through holes 9 in a positive manner. The forward winding coils 3 and the reverse winding coil 4 are wrapped up by a pair of magnetic cores 2.

The above are only preferred embodiments of the present invention; the examples, however, are not exhaustive of the many possible embodiments of the disclosure. All changes and modifications made in accordance with the content of the disclosure should fall within the technical scope of the present invention.

What is claimed is:

1. A fully coupled magnetic device, which comprises at least two phases of circuits, wherein each phase of the two phases of circuits comprises multiple coupling units (1) all of which are connected, every two phases of circuits are directly coupled through at least one coupling unit (1), and a direction of a magnetic field generated by DC (direct current) of one phase of the two phases of circuits is opposite to that of another phase of the two phases of circuits;

the fully coupled magnetic device further comprises multiple identical coupling units (1) arranged in a matrix of N rows×(N−1) columns, wherein the matrix of the coupling units (1) is denoted as: $A=(a_{ij})_{N\times(N-1)}$, where a phase number N of the fully coupled magnetic device is an integer number≥2, $a_{ij}$ is the coupling unit in the $i^{th}$ row and $j^{th}$ column of the matrix A, i=1, 2, 3, . . . N, j=1, 2, 3, . . . N−1; each coupling unit (1) comprises a magnetic core (2), a forward winding coil (3) and a reverse winding coil (4), and the forward and reverse winding coils are wound on the magnetic core (2) or the magnetic core (2) wraps the forward and reverse winding coils, the number of turns of the forward and reverse winding coils is the same, and the magnetic fields in the magnetic core (2) generated by currents in the forward and reverse winding coils are opposite to each other in direction, and all N input terminals are located at one side of the matrix, and all N output terminals are located at the other side of the matrix; when p=1 (p represents phase number and varies from 1 to N), the $1^{st}$ phase current starts from the first input terminal, passes sequentially through the forward winding coil (3) within the coupling units of $a_n$, $a_{12}$, $a_{13}$, ... $a_{1(N-1)}$, and then passes sequentially through the reverse winding coil (4) within the coupling units of $a_{2(N-1)}$, $a_{3(p-2)}$, $a_{4(N-3)}$, ... $a_{N1}$, all connected in series until reaching the first output terminal to become the complete $1^{st}$ phase circuit; when p=2, 3, 4, ... N−1, the $p^{th}$ phase current starts from the $p^{th}$ input terminal, passes through the reverse winding coil (4) of the coupling units $a_{1(p-1)}$, $a_{2(p-2)}$, $a_{3(p-3)}$, ... $a_{(p-1)1}$, then passes through the forward winding coil (3) of the coupling units $a_{p1}$, $a_{p2}$, $a_{p3}$, ... $a_{p(N-1)}$, then passes through the reverse winding coil (4) of the coupling units $a_{(p+1)(N-1)}$, $a_{(p+2)(N-2)}$, $a_{(p+3)(N-3)}$, ... $a_{Np}$, all connected in series until reaching the $p^{th}$ output terminal to become the $p^{th}$ phase circuit; when p=N, the $N^{th}$ phase current starts from the $p^{th}$ input terminal, passes through the reverse winding coil (4) of the coupling units $a_{1(p-1)}$, $a_{2(p-2)}$, $a_{3(p-3)}$, ... $a_{(p-1)1}$, and then go through the forward winding coil (3) of the coupling units $a_{p1}$, $a_{p2}$, $a_{p3}$, ... $a_{p\ (N-1)}$, all connected in series until reaching the $N^{th}$ output terminal to become the $N^{th}$ phase circuit.

2. The fully coupled magnetic device according to claim 1, wherein the forward winding coil (3) and the reverse winding coil (4) are both solenoid coils wound on the magnetic core (2), the magnetic core (2) has a single layer structure which is made from magnetic materials or a laminated structure which is formed by stacking multiple layers of magnetic materials and insulating materials in sequence, the magnetic core (2) has an open loop or a closed loop.

3. The fully coupled magnetic device according to claim 2, wherein the coupling unit (1) adopts sequential multi-layer deposition and integration process, from bottom to top, comprises a bottom conductor layer (5), a magnetic core layer (6) and a top conductor layer (7); there is an insulating layer (8) between two adjacent layers, multiple through holes (9) are provided in the insulating layer (8) for connecting the bottom conductor layer (5) and the top conductor layer (7), the through holes (9) are filled with conductive materials, two layers of conductors form a spiral through the through holes (9) and are wound on the magnetic core layer (6), a conductive path is formed from the input terminal to the output terminal of each phase of circuit.

4. The fully coupled magnetic device according to claim 3, wherein the bottom conductor layer (5), the magnetic core layer (6) and the top conductor layer (7) are all fabricated using conductive material by micro-nano fabrication method, and the insulating layer (8) is fabricated using insulating material by micro-nano fabrication method, the micro-nano fabrication method comprises photolithography, electrochemical deposition, physical vapor deposition, dry etching and wet etching.

5. The fully coupled magnetic device according to claim 1, wherein the forward winding coil (3) and the reverse winding coil (4) are both stripline coils, and the magnetic core (2) comprises an upper layer and a lower layer, the magnetic core (2) wraps around the forward winding coil (3) and the reverse winding coil (4); the magnetic core (2) has a single layer structure which is made from magnetic materials or a laminated structure which is formed by stacking multiple layers of magnetic materials and insulating materials in sequence, the magnetic core (2) has an open loop or a closed loop.

6. The fully coupled magnetic device according to claim 5, wherein the coupling unit (1) adopts sequential multi-layer deposition and integration process, from bottom to top, comprising a bottom magnetic core (10), a bottom conductor layer (11), a top conductor layer (12), and a top magnetic core (13); there is an insulating layer (8) between two adjacent layers; multiple through holes (9) are provided for connecting the top conductor layer (12) and the bottom conductor layer (11); the through holes (9) are filled with conductive materials, and a conductive path is formed from the input terminal to the output terminal of each phase of circuit.

7. The fully coupled magnetic device according to claim 6, wherein the bottom magnetic core (10), the bottom conductor layer (11), the top conductor layer (12) and the top magnetic core (13) are all fabricated using conductive material by micro-nano fabrication method, and the insulating layer is fabricated using insulating material by micro-nano fabrication method, the micro-nano fabrication method comprises photolithography, electrochemical deposition, physical vapor deposition, dry etching and wet etching.

8. The fully coupled magnetic device according to claim 1, wherein there are two magnetic cores (2), each magnetic core (2) comprises a bottom magnetic core (10) and a top magnetic core (13); the forward winding coil (3) and the reverse winding coil (4) are respectively spiral, and the top and bottom magnetic cores are respectively wrapped around both the forward winding coil (3) and the reverse winding coil (4) respectively; the bottom magnetic core (10) and the top magnetic core (13) of the each magnetic core (2) have a single layer structure which is made from magnetic materials or a laminated structure which is formed by stacking multiple layers of magnetic materials and insulating materials in sequence, the bottom magnetic core (10) and the top magnetic core (13) of the each magnetic core (2) have an open loop or a closed loop.

9. The fully coupled magnetic device according to claim 8, wherein the coupling unit (1) adopts sequential multi-layer deposition and integration process, from bottom to top, comprising the bottom magnetic core (10), the lower wire layer (11), the upper wire layer (12) and the top magnetic core (13); there is an insulating layer (8) between two adjacent layers; multiple through holes (9) are provided for connecting the lower wire layer (11) and the upper wire layer (12), and the through holes (9) are filled with conductive materials; both the forward winding coil (3) and the reverse winding coil (4) are in a spiral shape and symmetrical to each other; the forward winding coil (3) and the reverse winding coil (4) are in the opposite spiral direction, the forward and reverse winding coils in the bottom conductor layer are respectively positively connected to the forward and reverse winding coils in the top conductor layer through the through holes (9).

* * * * *